(12) United States Patent
Feinauer et al.

(10) Patent No.: US 7,631,407 B2
(45) Date of Patent: Dec. 15, 2009

(54) MACHINE TOOL AND METHOD FOR CUTTING MACHINING OF WORK PIECES

(75) Inventors: Achim Feinauer, Göppingen (DE); Thomas Altmann, Lauterstein (DE); Pavel Blazek, Owen (DE)

(73) Assignee: Stama Maschinenfabrik GmbH, Schlierbach (DE)

( * ) Notice: Subject to any disclaimer, the term of this patent is extended or adjusted under 35 U.S.C. 154(b) by 0 days.

(21) Appl. No.: 11/706,008

(22) Filed: Feb. 13, 2007

(65) Prior Publication Data
US 2007/0204732 A1 Sep. 6, 2007

(30) Foreign Application Priority Data
Feb. 13, 2006 (DE) .................. 10 2006 007 700

(51) Int. Cl.
*B23Q 3/157* (2006.01)
*B23P 23/02* (2006.01)
(52) U.S. Cl. .............. 29/27 R; 82/127; 29/27 C; 409/168; 483/15
(58) Field of Classification Search ............. 29/27 R, 29/27 C, 26 A, 38 A, 38 B, 564; 409/165, 409/168, 1; 408/89, 90; 82/1.11, 127; 483/14–18; B23Q 3/157; B23P 23/02
See application file for complete search history.

(56) References Cited

U.S. PATENT DOCUMENTS

| | | | | |
|---|---|---|---|---|
| 2,464,813 A | * | 3/1949 | Karge | 29/39 |
| 4,400,859 A | * | 8/1983 | Woythal et al. | 29/27 C |
| 4,457,193 A | * | 7/1984 | Matthey | 82/129 |
| 5,025,539 A | | 6/1991 | Stark | |
| 6,131,259 A | | 10/2000 | Stark et al. | |
| 6,836,941 B2 | * | 1/2005 | Prust et al. | 29/27 C |
| 6,874,213 B2 | * | 4/2005 | Prust et al. | 29/27 C |
| 7,216,407 B2 | * | 5/2007 | Yonemaru | 29/27 C |
| 7,367,929 B2 | * | 5/2008 | Feinauer et al. | 483/15 |
| 2002/0020258 A1 | | 2/2002 | Grossmann | |
| 2002/0086628 A1 | * | 7/2002 | Blazek | 451/365 |
| 2006/0048360 A1 | * | 3/2006 | Yonemaru | 29/27 C |

FOREIGN PATENT DOCUMENTS

| | | |
|---|---|---|
| DE | 36 33 050 | 9/1986 |
| DE | 35 30 479 A1 | 3/1987 |
| DE | 38 18 903 | 6/1988 |
| DE | 196 35 258 | 8/1996 |
| DE | 196 46 124 | 11/1996 |

(Continued)

OTHER PUBLICATIONS

European Search Report for Patent Application No. EP 07 002 348.6, European Patent Office, 4 pages, May 15, 2007.

*Primary Examiner*—Boyer D Ashley
*Assistant Examiner*—Sara Addisu
(74) *Attorney, Agent, or Firm*—Klarquist Sparkman, LLP

(57) ABSTRACT

A machine tool for cutting machining of work pieces has a tool spindle and a work piece spindle. The work piece spindle is a hollow spindle having a through hole extending through the spindle and a holding mechanism for holding a work piece at one end. The work piece held in the holding mechanism can be machined through the through hole by means of a machining tool held in the tool spindle.

21 Claims, 4 Drawing Sheets

FOREIGN PATENT DOCUMENTS

| | | |
|---|---|---|
| DE | 196 35 258 C1 | 2/1998 |
| DE | 100 54 965 | 11/2000 |
| DE | 20 2004 018 385 | 11/2004 |
| DE | 10 2004 019 722 | 12/2005 |
| EP | 0 949 029 A1 | 10/1999 |
| EP | 1281462 A2 * | 2/2003 |
| GB | 2178991 A * | 2/1987 |
| GB | 2 195 280 | 4/1988 |
| JP | 02256404 A * | 10/1990 |
| WO | WO 89/11951 | 12/1989 |

* cited by examiner

MACHINE TOOL AND METHOD FOR CUTTING MACHINING OF WORK PIECES

CROSS-REFERENCE TO RELATED APPLICATIONS

This application claims the benefit of German Patent Application No. DE 10 2006 007 700.8, filed Feb. 13, 2006, which is hereby incorporated by reference.

BACKGROUND

The present invention relates to a machine tool and a method for cutting machining of work pieces, and in particular for metal cutting machining of metallic work pieces.

DE 196 35 258 C1 discloses a prior art machine tool having a tool spindle which is arranged on a traveling column so that it can be moved in three spatial axes perpendicular to one another. The tool spindle points downwards with its tool. A work piece spindle is mounted pivotably in a bridge below the tool spindle, so that the work piece spindle can be brought both into a horizontal and into a vertical position. The work piece spindle is designed such that a work piece rod can be pushed forwards from the rear through the work piece spindle until the front end of the work piece rod projects out of the work piece spindle. The front end can then be machined by means of a tool arranged in the tool spindle. This known machine tool can be advantageously used for producing a variety of work pieces from the rod.

In order to machine that end of the work piece which is held in the work piece spindle (machining of what is known as the sixth side), DE 196 35 258 C1 proposes an additional gripping and pivoting unit which is arranged opposite of the work piece spindle. The gripping and pivoting unit can take over a partly machined work piece from the work piece spindle, so that the sixth side is accessible then. Such a machine tool allows machining of the work piece at all six sides, while the work piece has to be rearranged once only. This is advantageous because each re-arranging may impair the machining accuracy due positional tolerances. Moreover, each re-arrangement takes time, which affects productivity.

In order to exploit the advantages of the known machine tool as well as possible, it is necessary to machine the first five sides of the work piece as completely as possible before the work piece is rearranged for machining the sixth side. This may present difficulties in the case of complex work pieces, for example when burrs occur on already machined work piece sides due to the machining of the sixth side. In such instances, the work piece has to be re-arranged a second time, contrary to the original idea, or separate re-machining is required.

SUMMARY

Against this background, it is an object of the present invention to provide an improved machine tool and method for efficiently machining work pieces.

It is another object to provide a machine tool that allows machining operations in a simple, quick and accurate manner.

According to one aspect, there is provided a machine tool for metal cutting machining of metallic work pieces, comprising a tool spindle for holding a machining tool and a first work piece spindle having a first end, a second end, a through hole extending from the first end to the second end, and a holding mechanism arranged at the first end for holding a work piece, wherein the work piece has a front side facing away from the first end and a rear side directed to the second end, wherein the work piece spindle and the tool spindle are movable relative to each other for machining the work piece held by the holding mechanism by means of the machining tool arranged in the tool spindle, and wherein the through hole is designed such that the rear end can be machined by means of the machining tool projecting into the through hole from the second end.

According to another aspect, there is provided a machine tool for cutting machining of work pieces, comprising a tool spindle for receiving a machining tool and comprising at least one work piece spindle for receiving a work piece, wherein the work piece spindle is a hollow spindle having a through hole and a clamping mechanism arranged at a first end of the through hole, and wherein the work piece spindle and the tool spindle are movable relative to each other for machining a work piece arranged in the clamping mechanism by means of a machining tool arranged in the tool spindle, wherein the tool spindle and the work piece spindle are designed such that the work piece held in the clamping mechanism can be machined through the through hole by means of the machining tool held in the tool spindle.

According to yet another aspect, there is provided method for cutting machining of work pieces, comprising the steps of providing a tool spindle for holding a machining tool and providing at least a first hollow work piece spindle having a first end, a second end, a through hole extending from the first end to the second end, and a holding mechanism arranged at the first end for holding a work piece, placing a work piece having a front part and a rear part into the holding mechanism, such that the front part is accessible at the first end and the rear part is directed to the second end, machining the front part by means of the machining tool, and machining the rear part by means of the machining tool, wherein the machining tool projects into the through hole from the second end.

The novel machine tool and method are based on the idea of machining a work piece through the work piece spindle, i.e., from its rear side. The work piece is approached by the machining tool from the second end of the work piece spindle and thus through the interior of the work piece spindle. Machining of the end face of the work piece concealed in or by the work piece spindle is therefore enabled. For example, a duct may be drilled through the work piece from its rear side, the drilling needle then emerging on the sixth side of the work piece which projects out of the work piece spindle. It is also possible to remove burrs from the "hidden" side of the work piece through the work piece spindle. Of course, the work piece held in the work piece spindle may also be machined at the front, as usual, and on sides projecting forwards out of the spindle. A particular aspect, however, is that the work piece can also be machined on its rear side which in conventional machining lies in the spindle or is at least concealed by the spindle. The novel machine tool and the novel method consequently differ from conventional machining principles which allow machining of a work piece at only one end, and also from concepts in which a work piece may be held centrally in order to machine two opposing end faces.

The novel machine tool and method provide greater flexibility in the machining of work pieces, which is particularly beneficial in the machining of complex work pieces that require a variety of machining steps on various work piece sides. The work piece can be machined in a way which has not been possible hitherto, preferably without the work piece being re-arranged more than once. The novel machine tool and the novel method thus make it possible to have a further reduction in the chucking operations. Machining accuracy is thereby be further increased, and the machining time can be further reduced.

In a preferred refinement, the through hole extends coaxially with respect to an axis of rotation of the work piece spindle.

Alternatively, the through hole could also lie offset with respect to the axis of rotation of the work piece spindle, or the through hole could run obliquely or transversely with respect to the axis of rotation of the work piece spindle, in order to allow corresponding access to the chucked work piece. By contrast, the preferred embodiment can be implemented relatively simply and cost-effectively, and it allows flexible access to the work piece, with this access being largely independent of the rotary position of the work piece spindle about its axis of rotation.

In a further refinement, the work piece spindle has a spindle length in the direction of the through hole and an outer spindle diameter, with the spindle length being approximately equal to or smaller than the outer spindle diameter.

In this refinement, the work piece spindle has a relatively short and compact form of construction which may possibly be at the expense of an increased outer diameter of the work piece spindle. In other words, the work piece spindle is designed such that it is as short as possible in the direction of its through hole. This refinement has the advantage that the machining of the chucked work piece can take place from the rear side by means of relatively short tools which provide higher stability and therefore higher machining accuracy. Owing to the short and compact form of construction, it is even possible for a work piece which is arranged outside or in front of the work piece spindle to be machined from the rear.

In a further refinement, the work piece spindle is designed as a turning or lathing spindle.

This refinement involves the work piece spindle being capable of generating rotational speeds and torques which are required for a turning or lathing operation of preferably metallic work pieces. In a preferred embodiment, the work piece spindle offers rotational speeds of up to 1000 revolutions per minute (or more) and a maximum torque in the range of between 50 and 200 Nm. Due to this refinement, flexibility in the machining of the work piece is increased, because the work piece can also be machined by turning in the existing chucking fixture, including a turning operation of the work piece side which is arranged in the work piece spindle. Accordingly, this refinement allows to produce highly complex work pieces very efficiently and with high accuracy.

In a further refinement, the through hole has a first inner diameter at the first end and a second inner diameter at a second end, the first inner diameter being substantially smaller than the second inner diameter. In a preferred embodiment, the second inner diameter of the through hole (at the second end) lies in the range of between about 15 cm and about 30 cm.

This refinement allows the tool spindle with a machining tool to penetrate deeply into the work piece spindle, so that even shorter and thus more stable machining tools can be used. It is particularly preferred if the inner diameter of the through hole at the second end of the work piece spindle is adapted approximately to the outer contour of the tool spindle, in order to allow an optimal penetration of the tool spindle into the work piece spindle.

In a further refinement, the work piece spindle is mounted pivotably about a pivot axis. The pivot axis preferably lies approximately centrally with respect to the work piece spindle. Furthermore, it is preferred if the relative pivoting range of the work piece spindle (with respect to the tool spindle) is at least 180°.

These refinements make it easier to machine a work piece arranged in the work piece spindle by means of the tool spindle, and they allow flexible machining within a relatively small range of movement of the machine. If the work piece spindle is pivotable through at least 180° in relation to the tool spindle, both the size of the work piece which projects out of the work piece spindle and the (rear) sides of the work piece which lie in the work piece spindle or point towards the work piece spindle can be machined in one chucking fixture.

In a further refinement, a further work piece spindle is provided which is movable relative to the at least one work piece spindle, in order to transfer a partly machined work piece from one work piece spindle to the other.

In this refinement, the novel machine tool has at least three spindles, namely one tool spindle and two work piece spindles movable relative to each other. The refinement allows a very flexible 6-side machining of a work piece with only one re-chucking operation, which can be carried out with very high positioning accuracy by direct transfer from one work piece spindle to the other.

In a further refinement, the second work piece spindle is a hollow spindle for receiving and machining rod-shaped work pieces.

This refinement is known per se from the machine tool described in the introduction. However, it is particularly advantageous in conjunction with the present invention, because the high machining accuracy and machining speed of the known machine can even further be increased by means of the present invention. Furthermore, it is conceivable to machine a rod-shaped work piece in the second work piece spindle on the rear side, with the result that flexibility is increased even further. In most general terms, however, the second work piece spindle may also be designed for the machining of non-rod-shaped work pieces, for example for the machining of castings or forgings.

It is to be appreciated that the features mentioned above and those yet to be explained below may be used not only in the combination specified in each case, but also in other combinations or alone, without departing from the scope of the present invention.

BRIEF DESCRIPTION OF THE DRAWINGS

Exemplary embodiments of the invention are illustrated in the drawing and are explained in more detail in the following description. In the drawing.

DESCRIPTION OF PREFERRED EMBODIMENTS

Figure 1:
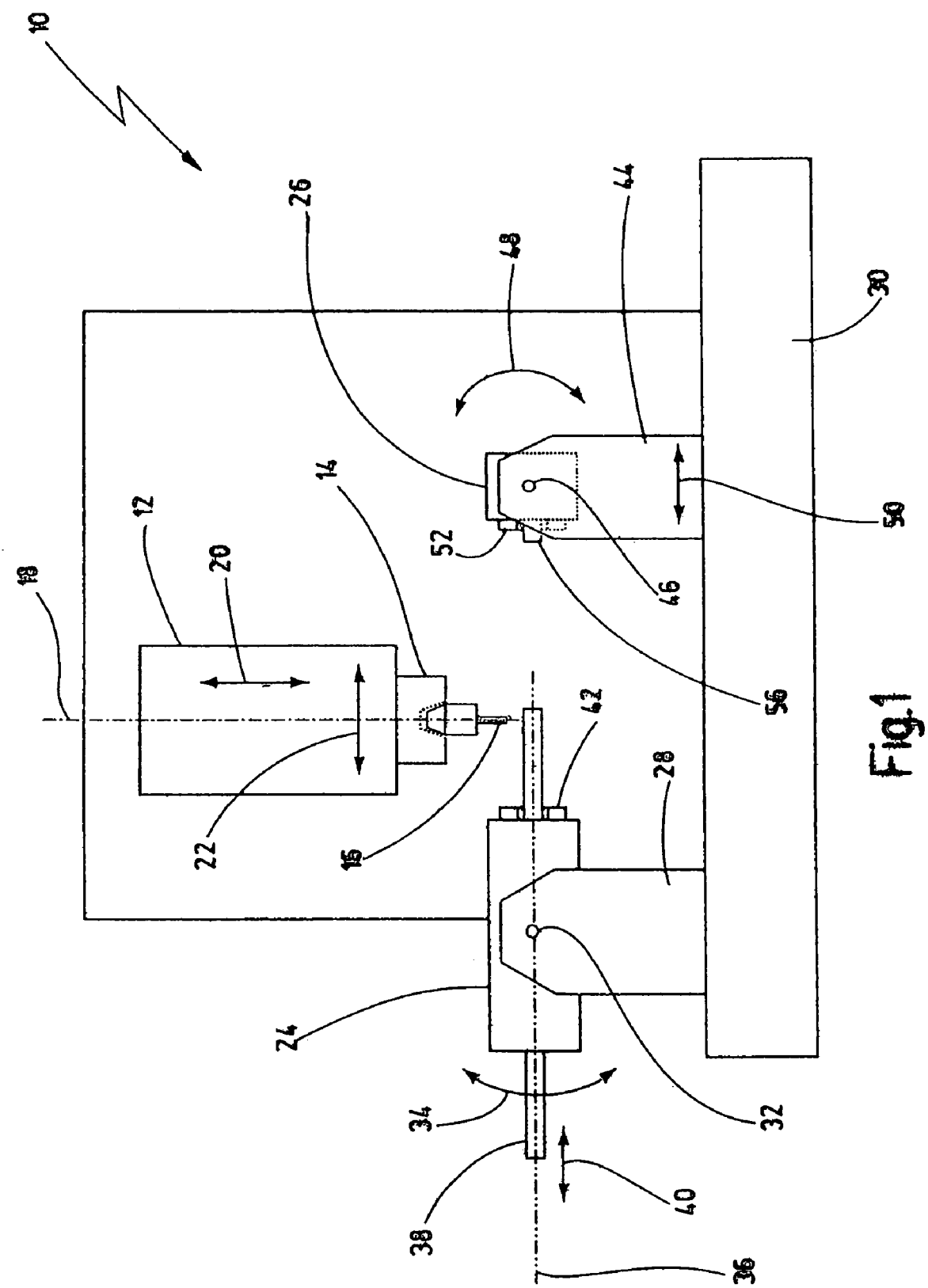
FIG. 1 shows an illustration of a preferred embodiment of the novel machine tool.
Figure 2:
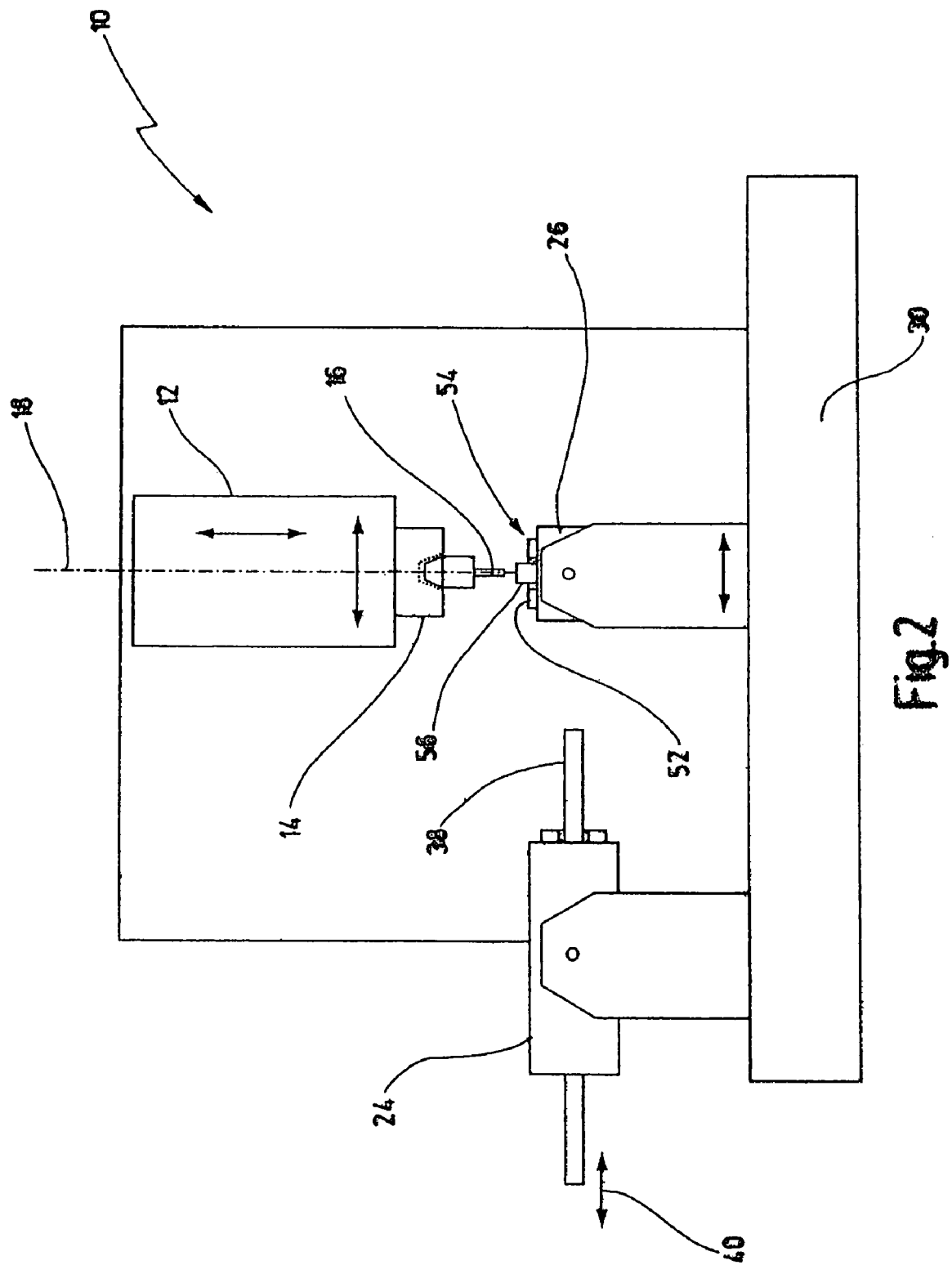
FIG. 2 shows the machine tool from FIG. 1 in a different working position.

In FIGS. 1 and 2, an embodiment of the novel machine tool is designated in its entirety by reference numeral 10. The machine tool 10 has a first spindle unit 12 including a tool spindle 14 in which a machining tool 16 is arranged. The machining tool 16 is, for example, a milling head or a drilling needle which is set in a rotational movement about the spindle axis 18 by means of the tool spindle 14. Alternatively, the machining tool may be, for example, a turning chisel in order to carry out turning machining on a work piece when the tool spindle does not rotate. Furthermore, other machining tools suitable and/or required for a cutting machining of (preferably) metallic work pieces may also be arranged into the toolholder of the tool spindle 14.

The spindle unit 12 can be moved in the direction of the arrows 20 and 22 and in the direction perpendicular to the drawing plane. Correspondingly, the spindle unit 12 can be moved in three spatial directions which are perpendicular to one another and which are designated conventionally as the x-, y- and z-direction. In the preferred embodiment, the first spindle unit 12 is arranged on a traveling column which executes the movements in the three spatial directions x, y and z. Alternatively, the spindle unit 12 may be mounted otherwise, for example on a bridge or on a hexapod arrangement. Furthermore, the spindle unit 12 may be rigid in one or more directions of movement while the tool spindle (or another tool carrier) is movable in relation to the spindle unit.

The machine tool 10 further has a first work piece spindle 24 and a the second work piece spindle 26 which in each case function as work piece carriers. The work piece spindle 24 is mounted in a bridge 28 which is arranged fixedly on a machine bed 30. The work piece spindle 24 can be pivoted in the bridge 28 about a pivot axis 32, i.e., in the direction of double arrow 34. Furthermore, the work piece spindle 24 is rotatable about its spindle axis 36. In a preferred embodiment, the first work piece spindle 24 is designed as a turning spindle, i.e., it is capable of providing rotational speeds and torques which allow a turning machining of a work piece by means of a turning tool fixed in the tool spindle 14.

Reference numeral 38 designates a work piece rod which is pushed forwards through the work piece spindle 24 from the rear in the direction of arrow 40 until the front end of the work piece rod 38 projects out of the work piece spindle 24. At the front end of work piece spindle 24, there is arranged a clamping mechanism 42 by means of which the front end of the work piece rod 38 is fixedly arranged in terms of rotation in the work piece spindle 24. This involves, for example, a multi-jaw clamping chuck. It should be appreciated that the work piece spindle 24 is designed as a hollow spindle so that the work piece rod 38 can be pushed through forwards within the spindle 24.

As explained in more detail below with reference to FIGS. 3 and 4, the second work piece spindle 26 is likewise designed as a hollow spindle, wherein this characteristic mainly serves for machining a work piece arranged in spindle 26 from the rear, i.e., through the tool spindle 26.

The second work piece spindle 26 is mounted in a bridge 44 and is pivotable about a pivot axis 46, i.e., in the direction of arrow 48. As illustrated in FIG. 1, the pivot axis 46 lies approximately centrally with respect to the work piece spindle 26.

The bridge 44 is movable in the direction of double arrow 50 on the machine bed 30. It is thereby possible to bring the second work piece spindle 26 so near to the first work piece spindle 24 that a partly machined front end of the work piece rod 38 can be transferred to the clamping mechanism 52 at the front end 54 of the work piece spindle 26. Subsequently, the partly machined front end of work piece rod 38 is detached by means of a suitable separating tool, which is preferably arranged into the toolholder of the tool spindle 14, and the work piece spindle 26 is moved into the position illustrated in FIG. 1 in order to allow a final machining of the work piece 56 detached from the rod 38 then (see FIG. 2). In the meantime, the work piece rod 38 can be pushed further forward in the direction of arrow 40 in the work piece spindle 24 in order to commence the machining of the next work piece.

In the working position illustrated in FIG. 2, the sixth side of the work piece 56 can be machined in a way known per se by means of the tool spindle 14. Preferably, the second work piece spindle 26 is also designed as a turning spindle, so as to allow turning machining on the sixth side of the work piece 56 and on the circumferential sides of the work piece 56 which project out of the work piece spindle 26. Since the second work piece spindle 26 is pivotable about the pivot axis 46, the machining tool 16 can be advanced to the work piece 56 at variably adjustable angles.

Furthermore, the novel machine tool 10 allows an advantageous machining of the work piece 56 arranged in the work piece spindle 26 from the rear, i.e., through the work piece spindle 26. This is explained in more detail below with reference to FIGS. 3 and 4.

Figure 3:
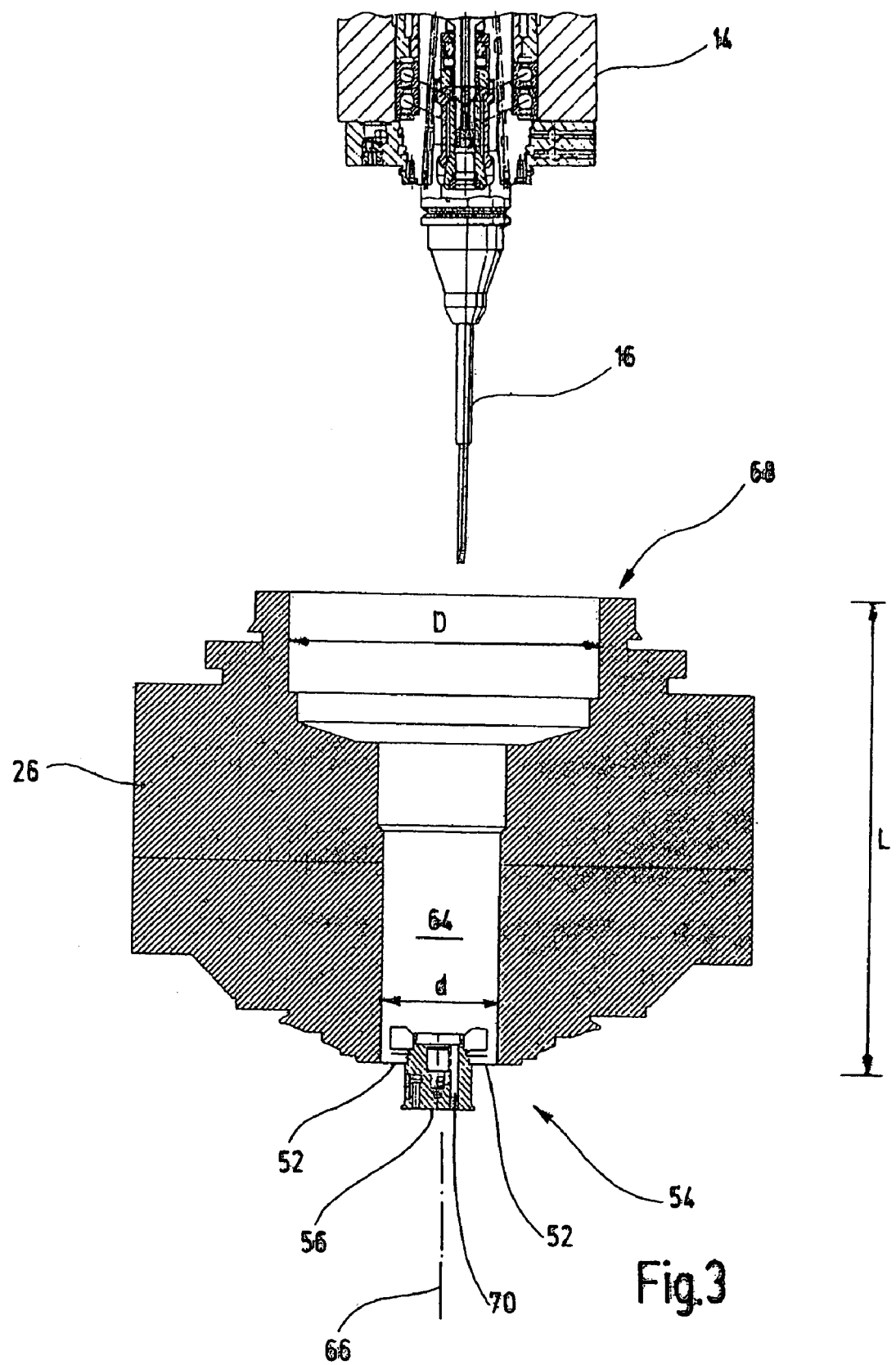
FIG. 3 shows the tool spindle and a work piece spindle of the machine tool from FIGS. 1 and 2 in a partially sectional enlarged view of a detail.
Figure 4:
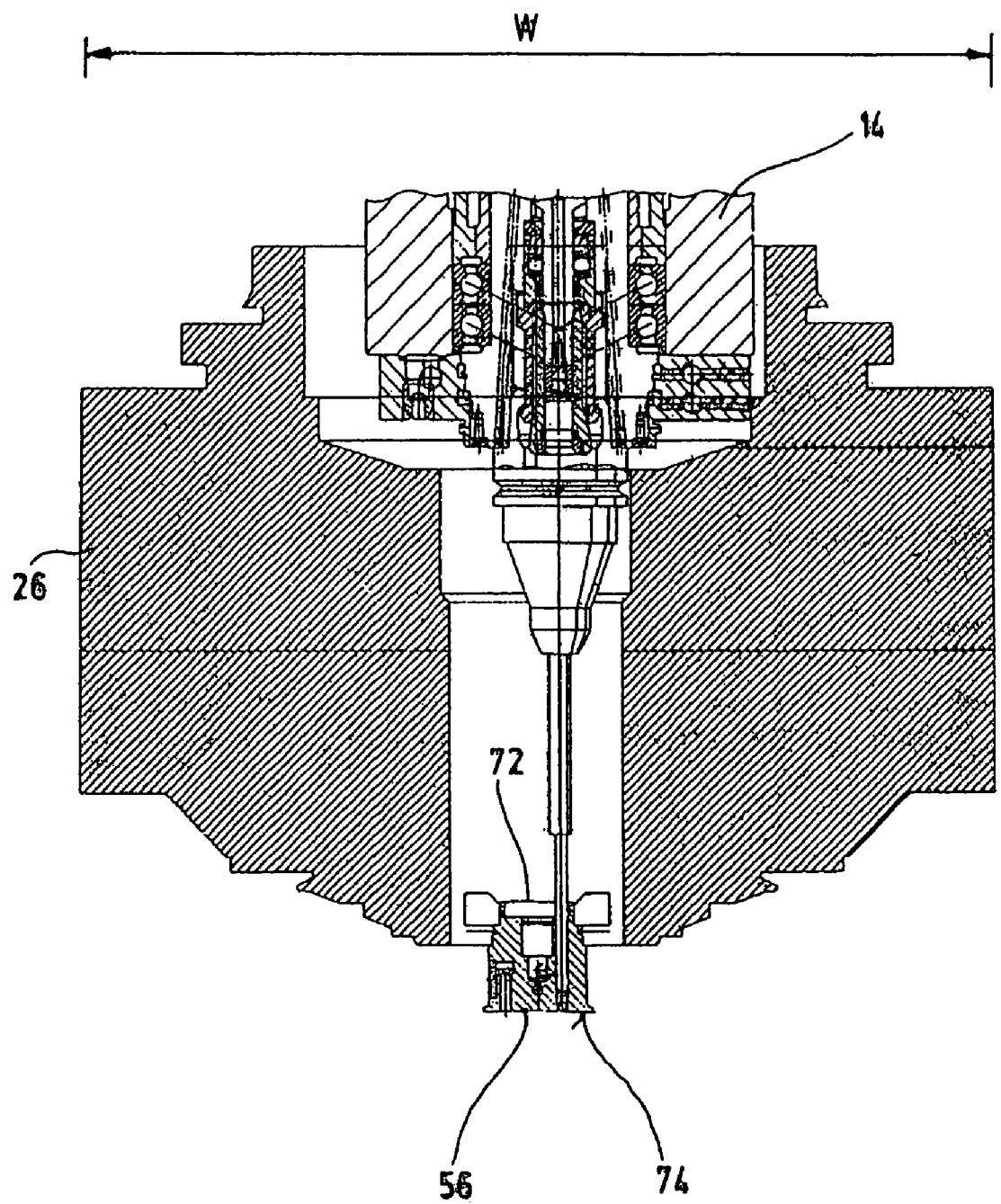
FIG. 4 shows the tool spindle and the work piece spindle from FIG. 3 in a second working position.

In FIGS. 3 and 4, the tool spindle 14 and the second work piece spindle 26 holding the partly machined work piece 56 are shown in a partially sectional illustration. For the sake of clarity, in the case of the work piece spindle 26, details, such as the spindle rotor, the bearings and the power and supply lines, are not illustrated. Furthermore, work piece spindle 26 is in a pivoting position which is pivoted through 180° with respect to the illustration in FIG. 2. In other words, the first end 54 of the work piece spindle 26 points downwards here, so that the tool spindle 14 can be moved with the machining tool 16 into the work piece spindle 26 from the rear (FIG. 4).

The work piece spindle 26 therefore has a through hole 64 which extends concentrically to the spindle axis 66 in this case. The through hole 64 has an inner diameter d of about 8 cm at the end 54 of the work piece spindle 26. At the second end 68, the through hole 64 has an inner diameter D which is about 23 cm here. The through hole 64 through work piece spindle 26 thus widens from the first end 54 to the second end 68 of the spindle 26, the widening preferably taking place in steps, as illustrated in FIGS. 3 and 4. Due to the relatively large inner diameter D at the second end 68 of the spindle 26, the tool spindle 14 with the machining tool 16 can penetrate far into the work piece spindle 26, as illustrated in FIG. 4.

Furthermore, in preferred embodiments, the work piece spindle 26 is implemented with a very short form of construction, in order to make it easier to machine the work piece 56 from the rear through the work piece spindle 26. In preferred exemplary embodiments, the length L of the work piece spindle 26 in the direction of the through hole 64 is approximately equal to or even smaller than the outer spindle diameter W. In a preferred exemplary embodiment, the length L of the work piece spindle 26 is about 30 cm, whilst the outer diameter W is about 40 cm.

As shown in FIGS. 3 and 4, the novel machine tool 10 is particularly capable of drilling a bore 70 through a partly machined work piece 56 from the rear. Moreover, that end face 72 of the work piece 56 which is arranged in the work piece spindle 26 can be freed of burrs very easily. The chips occurring during machining are discharged after the retraction of the tool spindle 14, for example by the work piece spindle 26 being pivoted about the pivot axis 46.

In a particularly preferred variant of the novel method, the work piece 56, after being arranged in the work piece spindle 26, is not only machined through the passage 64 from the rear, but also on the sides projecting out of the work piece spindle 26, as illustrated by way of example in FIG. 2. Since the work piece 56 does not have to be rearranged even during the machining of its opposite end faces 72, 74, very high machining accuracy is achieved.

What is claimed is:

1. A machine tool for cutting work pieces, comprising:
    a tool spindle for holding a machining tool; and
    a first work piece spindle having a first end, a second end, a through hole extending from the first end to the second end, and a holding mechanism arranged at the first end for holding a work piece,
    wherein the work piece has a front side facing away from the first end and a rear side facing towards the second end when held by the holding mechanism, and the work piece spindle and the tool spindle are movable relative to each other for machining both the front and rear sides of the work piece with the machining tool, and
    wherein the through hole is configured such that the rear side can be machined by projecting the machining tool into the through hole from the second end.

2. The machine tool of claim 1, wherein the work piece spindle has an axis of rotation, and wherein the through hole extends coaxially with respect to the axis of rotation.

3. The machine tool of claim 1, wherein the work piece spindle has a spindle length along the through hole and an outer spindle diameter transverse with respect to the through hole, with the spindle length being approximately equal to or smaller than the outer spindle diameter.

4. The machine tool of claim 1, wherein the work piece spindle is adapted to provide rotational speeds and torques sufficient for a turning or lathing operation on the work piece.

5. The machine tool of claim 1, wherein the through hole has a first inner diameter at the first end and a second inner diameter at the second end, with the first inner diameter being substantially smaller than the second inner diameter.

6. The machine tool of claim 1, wherein the work piece spindle is pivotably mounted for a pivoting movement about a pivot axis.

7. A machine tool for cutting work pieces, comprising:
    a tool spindle for holding a machining tool; and
    a first work piece spindle having a first end, a second end, a through hole extending from the first end to the second end, and a holding mechanism arranged at the first end for holding a work piece;
    a second work piece spindle movable relative to the first work piece spindle so that the work piece can be handed over directly from the second work piece spindle to the first work piece spindle,
    wherein the work piece has a front side facing away from the first end and a rear side directed to the second end,
    wherein the work piece spindle and the tool spindle are movable relative to each other for machining the work piece held by the holding mechanism by means of the machining tool arranged in the tool spindle, and
    wherein the through hole is designed such that the rear side can be machined by means of the machining tool projecting into the through hole from the second end.

8. The machine tool of claim 7, wherein the second work piece spindle is a hollow spindle having a second through hole designed for receiving and pushing forward rod-shaped work pieces.

9. The machine tool of claim 7, wherein the second work piece spindle is adapted to provide rotational speeds and torques sufficient for a turning or lathing operation on the work piece.

10. A machine tool for cutting work pieces, comprising a tool spindle for receiving a machining tool and comprising at least one work piece spindle for receiving a work piece,
    wherein the work piece spindle is a hollow spindle having a through hole with a first end and a second end, and a clamping mechanism arranged at the first end of the through hole,
    wherein the work piece spindle and the tool spindle are movable relative to each other for machining a rear side of a work piece arranged in the clamping mechanism with the machining tool, the rear side facing the second end of the through hole, and
    wherein the tool spindle and the work piece spindle are configured such that the rear side of the work piece can be machined through the through hole with the machining tool from the second end.

11. The machine tool of claim 10, wherein the work piece spindle has an axis of rotation, and wherein the through hole extends coaxially with respect to the axis of rotation.

12. The machine tool of claim 10, wherein the work piece spindle has a spindle length along the through hole and an outer spindle diameter transverse with respect to the through hole, with the spindle length being approximately equal to or smaller than the outer spindle diameter.

13. The machine tool of claim 10, wherein the work piece spindle is adapted to provide rotational speeds and torques sufficient for a turning or lathing operation on the work piece.

14. The machine tool of claim 10, wherein the tool spindle is adapted to provide rotational speeds and torques sufficient for a milling or drilling operation on the work piece.

15. The machine tool of claim 10, wherein the through hole has a first inner diameter at the first end and a second inner diameter at the second end, with the first inner diameter being substantially smaller than the second inner diameter.

16. The machine tool of claim 10, wherein the work piece spindle is pivotably mounted for a pivoting movement about a pivot axis.

17. A machine tool for cutting work pieces, comprising a tool spindle for receiving a machining tool and comprising a first and second work piece spindle for receiving a work piece, the second work piece spindle being movable relative to the first work piece spindle so that the work piece can be directly transferred between the first and second work piece spindles,
    wherein the work piece spindle is a hollow spindle having a through hole and a clamping mechanism arranged at a first end of the through hole,
    wherein the work piece spindle and the tool spindle are movable relative to each other for machining a work piece arranged in the clamping mechanism by means of a machining tool arranged in the tool spindle, and
    wherein the tool spindle and the work piece spindle are designed such that the work piece held in the clamping mechanism can be machined through the through hole by means of the machining tool held in the tool spindle.

18. The machine tool of claim 17, wherein the second work piece spindle is a hollow spindle having a second through hole designed for receiving and pushing forward rod-shaped work pieces.

19. The machine tool of claim 17, wherein the second work piece spindle is adapted to provide rotational speeds and torques sufficient for a turning or lathing operation on the work piece.

20. A method for cuffing work pieces, comprising the steps:
    providing a tool spindle for holding a machining tool and providing at least a work piece spindle having a first end, a second end, a through hole extending from the first end to the second end, and a holding mechanism arranged at the first end for holding a work piece;

placing a work piece having a front part and a rear part into the holding mechanism, such that the front part is accessible at the first end and the rear part is facing the second end;

machining the front part with the machining tool; and machining the rear part with the machining tool, wherein the machining tool projects into the through hole from the second end.

21. The method of claim 20, further comprising:

rotating the work piece spindle relative to the tool spindle between a first position where the machining tool machines the front part of the work piece and a second position where the machining tool machines the rear part of the work piece.

* * * * *